United States Patent
Lee et al.

(10) Patent No.: US 7,830,064 B2
(45) Date of Patent: Nov. 9, 2010

(54) MOTOR AND DRUM WASHING MACHINE HAVING THE SAME

(75) Inventors: Jang Jun Lee, Suwon-si (KR); Chan Bae Park, Anyang-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 283 days.

(21) Appl. No.: 12/078,475

(22) Filed: Mar. 31, 2008

(65) Prior Publication Data

US 2008/0246359 A1 Oct. 9, 2008

(30) Foreign Application Priority Data

Apr. 5, 2007 (KR) ...................... 10-2007-0033881

(51) Int. Cl.
*H02K 1/22* (2006.01)
(52) U.S. Cl. ...................... 310/266; 310/114
(58) Field of Classification Search ......... 310/112–114, 310/266, 216.007–216.008
See application file for complete search history.

(56) References Cited

U.S. PATENT DOCUMENTS

| | | | | |
|---|---|---|---|---|
| 4,081,726 A | * | 3/1978 | Brimer et al. | 318/751 |
| 4,501,980 A | * | 2/1985 | Welburn | 310/12.15 |
| 5,818,144 A | * | 10/1998 | Kim | 310/266 |
| 6,992,419 B2 | * | 1/2006 | Kim et al. | 310/266 |
| 7,557,486 B2 | * | 7/2009 | Choi et al. | 310/266 |
| 7,652,406 B2 | * | 1/2010 | Kim et al. | 310/266 |
| 2002/0008435 A1 | | 1/2002 | Kohler et al. | |
| 2004/0245878 A1 | * | 12/2004 | Kim et al. | 310/114 |
| 2005/0140232 A1 | * | 6/2005 | Lee et al. | 310/156.26 |
| 2007/0205682 A1 | * | 9/2007 | Choi et al. | 310/114 |
| 2007/0236099 A1 | * | 10/2007 | Kim et al. | 310/266 |

FOREIGN PATENT DOCUMENTS

| | | |
|---|---|---|
| CN | 1050954 | 4/1991 |
| CN | 1586031 | 2/2005 |
| CN | 1752328 | 3/2006 |
| KR | 10-2005-0119270 | 12/2005 |

OTHER PUBLICATIONS

Chinese Office Action in Chinese Patent Application No. 200810083378.7 on Nov. 27, 2009.

* cited by examiner

*Primary Examiner*—Thanh Lam
(74) *Attorney, Agent, or Firm*—Staas & Halsey LLP

(57) ABSTRACT

Disclosed are a motor and a drum washing machine having the same. The motor includes external stators and internal stators, which are respectively disposed in a ring shape and are separated from each other in a radial direction, and rotors, which are disposed in a ring shape and are rotatably installed between the external stators and the internal stators such that the rotors are rotated due to interaction with the external stators and the internal stators, thus being capable of generating a high rotary force while maintaining a uniform length in an axial direction.

20 Claims, 14 Drawing Sheets

MOTOR AND DRUM WASHING MACHINE HAVING THE SAME

CROSS-REFERENCE TO RELATED APPLICATIONS

This application claims the priority benefit of Korean Patent Application No. 2007-0033881, filed Apr. 5, 2007, in the Korean Intellectual Property Office, the disclosure of which is incorporated herein by reference.

BACKGROUND

1. Field

Embodiments relate to a motor, and more particularly, to a motor, which generates an increased rotary force, and a drum washing machine having the same.

2. Description of the Related Art

Generally, motors are apparatuses, which generate a rotary force using power applied thereto. Each of the motors includes a stator unit fixedly installed, a rotor unit rotatably installed and rotated by interaction with the stator unit, and a rotary shaft fixed to a center of rotation of the rotor unit and rotated together with the rotation of the rotor unit so as to transmit rotary force generated from the rotor unit to the outside.

The stator unit includes a stator consisting of coils obtained by winding a wire on a bobbin, and the rotor unit includes a rotor consisting of permanent magnets.

Korean Patent Laid-open Publication No. 10-2005-119270 discloses a conventional motor. Such a motor is used to rotate a drum of a drum washing machine. In the case that a motor is applied to a drum washing machine, the motor needs to be installed in a limited space in the drum washing machine and generate a high rotary force, enough to rotate the drum and laundry contained therein.

In order to improve the performance of the conventional motor, a length of the motor in an axial direction must be increased so as to increase an area, in which a stator and a rotor interact. However, it is difficult to install the above motor having an increased length in the axial direction in the drum washing machine having a limited space.

Further, in the above conventional motor, a bobbin, on which coils are wound, is formed by injection molding using a resin. In the case that the bobbin is made of the resin, a magnetic field generated from a stator cannot pass through the bobbin and thus magnetic flux leakage is generated, thereby causing the deterioration of the performance of the motor.

SUMMARY

In accordance with an aspect, there is provided a motor, which generates a high rotary force while maintaining a uniform length in an axial direction, and a drum washing machine having the motor.

In accordance with an aspect, there is provided a motor, which reduces magnetic flux leakage in a bobbin and thus increases performance, and a drum washing machine having the motor.

In accordance with an aspect, there is provided a motor comprising a stator unit including external stators and internal stators, which are respectively disposed in a ring shape and which are separated from each other in a radial direction; and a rotor unit including rotors, which are disposed in a ring shape and which are rotatably installed between the external stators and the internal stators.

The external stators and the internal stators may be coils obtained by winding a wire, and the rotors may be permanent magnets.

The stator unit may further include an external bobbin having a ring shape and provided with a plurality of external teeth extended from the inner circumferential surface thereof to form the coils of the external stators, and an internal bobbin having a ring shape and provided with a plurality of internal teeth extended from the outer circumferential surface thereof to form the coils of the internal stators.

The stator unit may further include a support frame having a ring shape and provided with an external support rib formed at the outer circumferential surface thereof to support the outer circumferential surface of the external bobbin and an internal support rib formed at the inner circumferential surface thereof to support the inner circumferential surface of the internal bobbin, and a stator fixing member formed by insert injection molding to fix the external stators and the internal stators under the condition that the external stators and the internal stators are installed on the support frame.

The rotor unit may further include a hub plate having a disk shape and provided with a shaft installation part formed through the central portion thereof, in which a rotary shaft is installed, and a rotor fixing member formed by insert injection molding to fix the rotors to the outer circumferential surface of the hub plate under the condition that the rotors are disposed in the ring shape.

The external bobbin may be formed by stacking a plurality of external bobbin plates, each of which is a metal plate having a ring shape, provided with the plurality of external teeth extended from the inner circumferential surfaces thereof.

Each of the plurality of external bobbin plates may be formed by connecting a plurality of external divided plates, each of which has an arc shape.

An external fixing protrusion may be formed on one end of each of the plurality of external divided plates so as to be fixed to the other end of the neighboring one of the plurality of external divided plates, and an external fixing groove may be formed in the other end of each of the plurality of external divided plates so as to be fixed to one end of the neighboring one of the plurality of external divided plates.

Each of the plurality of external divided plates may be formed by bending an external metal plate having a designated length and width and provided with the plurality of external teeth extended from one surface thereof in a width direction, and a plurality of external bending grooves, which allow the external metal plate to be easily bent, may be depressed in one surface of the external metal plate in the width direction.

The internal bobbin may be formed by stacking a plurality of internal bobbin plates, each of which is a metal plate having a ring shape, provided with the plurality of internal teeth extended from the outer circumferential surfaces thereof.

Each of the plurality of internal bobbin plates may be formed by connecting a plurality of internal divided plates, each of which has an arc shape.

An internal fixing protrusion may be formed on one end of each of the plurality of internal divided plates so as to be fixed to the other end of the neighboring one of the plurality of internal divided plates, and an internal fixing groove may be formed in the other end of each of the plurality of internal divided plates so as to be fixed to one end of the neighboring one of the plurality of internal divided plates.

Each of the plurality of internal divided plates may be formed by bending an internal metal plate having a designated length and width and provided with the plurality of internal teeth extended from one surface thereof in a width direction, and a plurality of internal bending grooves, which allow the internal metal plate to be easily bent, may be depressed in the other surface of the internal metal plate in the width direction.

In accordance with another aspect, there is provided a drum washing machine comprising a tub containing washing water, a drum rotatably installed in the tub, and a motor installed on the rear surface of the tub to rotate the drum, wherein a motor includes a stator unit including external stators and internal stators, which are respectively disposed in a ring shape and which are separated from each other in a radial direction; and a rotor unit including rotors, which are disposed in a ring shape and which are rotatably installed between the external stators and the internal stators.

BRIEF DESCRIPTION OF THE DRAWINGS

These and/or other aspects, features, and advantages will become apparent and more readily appreciated from the following description of exemplary embodiments, taken in conjunction with the accompanying drawings of which.

DETAILED DESCRIPTION OF EMBODIMENTS

Figure 1:
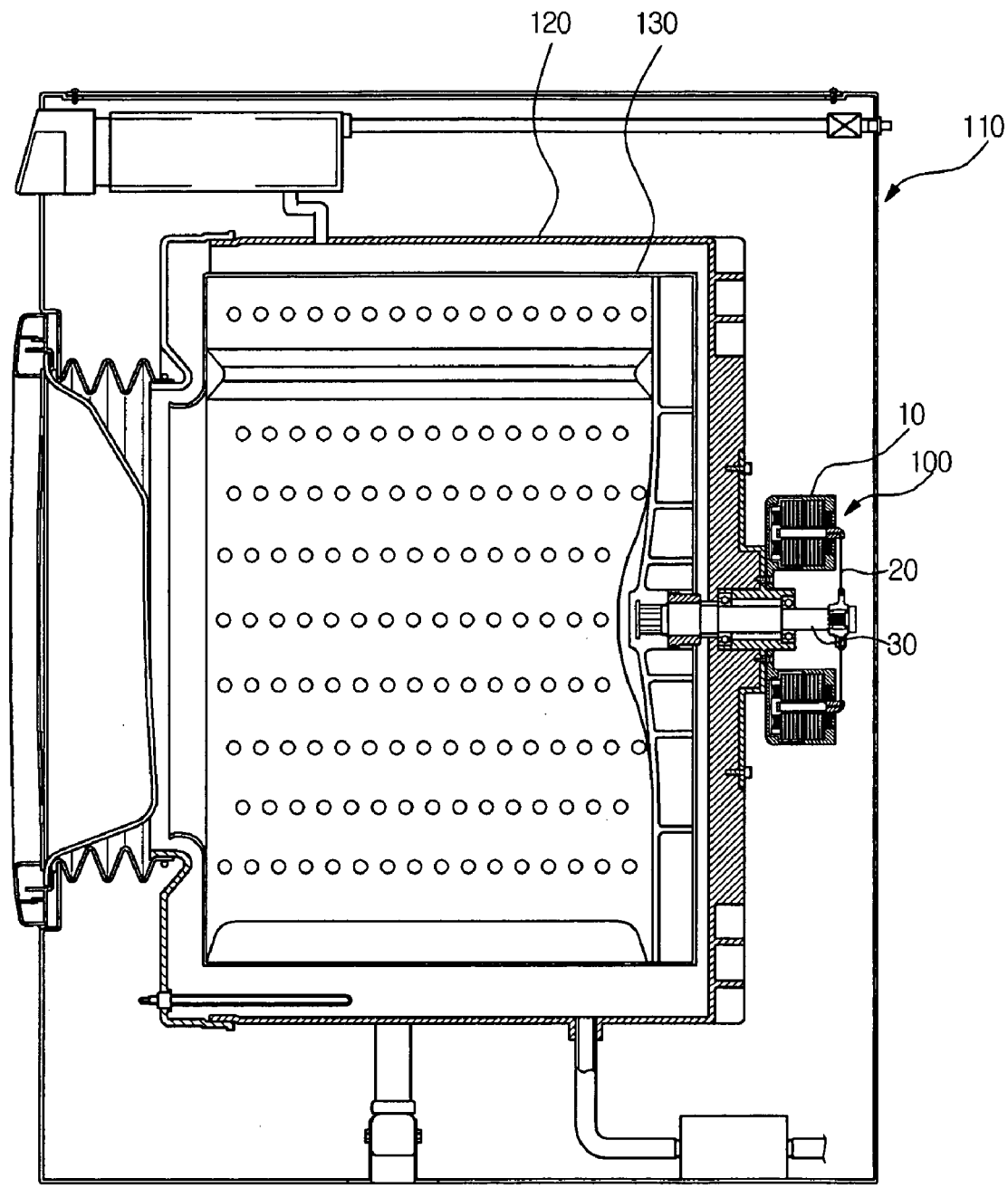
FIG. 1 is a longitudinal-sectional view of a drum washing machine having a motor in accordance with an exemplary embodiment.

Reference will now be made in detail to exemplary embodiments, examples of which are illustrated in the accompanying drawings, wherein like reference numerals refer to like elements throughout. Exemplary embodiments are described below by referring to the figures.

As shown in FIG. 1, a drum washing machine having a motor 100 in accordance with an exemplary embodiment includes a tub 120 installed in a housing 110 forming the external appearance of the washing machine for containing washing water, and a drum 130 rotatably installed in the tub 120.

Further, the motor 100 for rotating the drum 130 in accordance with an exemplary embodiment is installed at the outside of the rear surface of the tub 120. The motor 100 includes a stator unit 10 fixed to the rear surface of the tub 120, a rotor unit 20 rotatably installed and rotated by interaction with the stator unit 10, and a rotary shaft 30 provided with one end fixed to a center of rotation of the rotor unit 20 and the other end passing through the tub 120 and fixed to the rear surface of the drum 130 so as to transmit rotary force generated from the rotor unit 20 to the tub 120.

Figure 2:
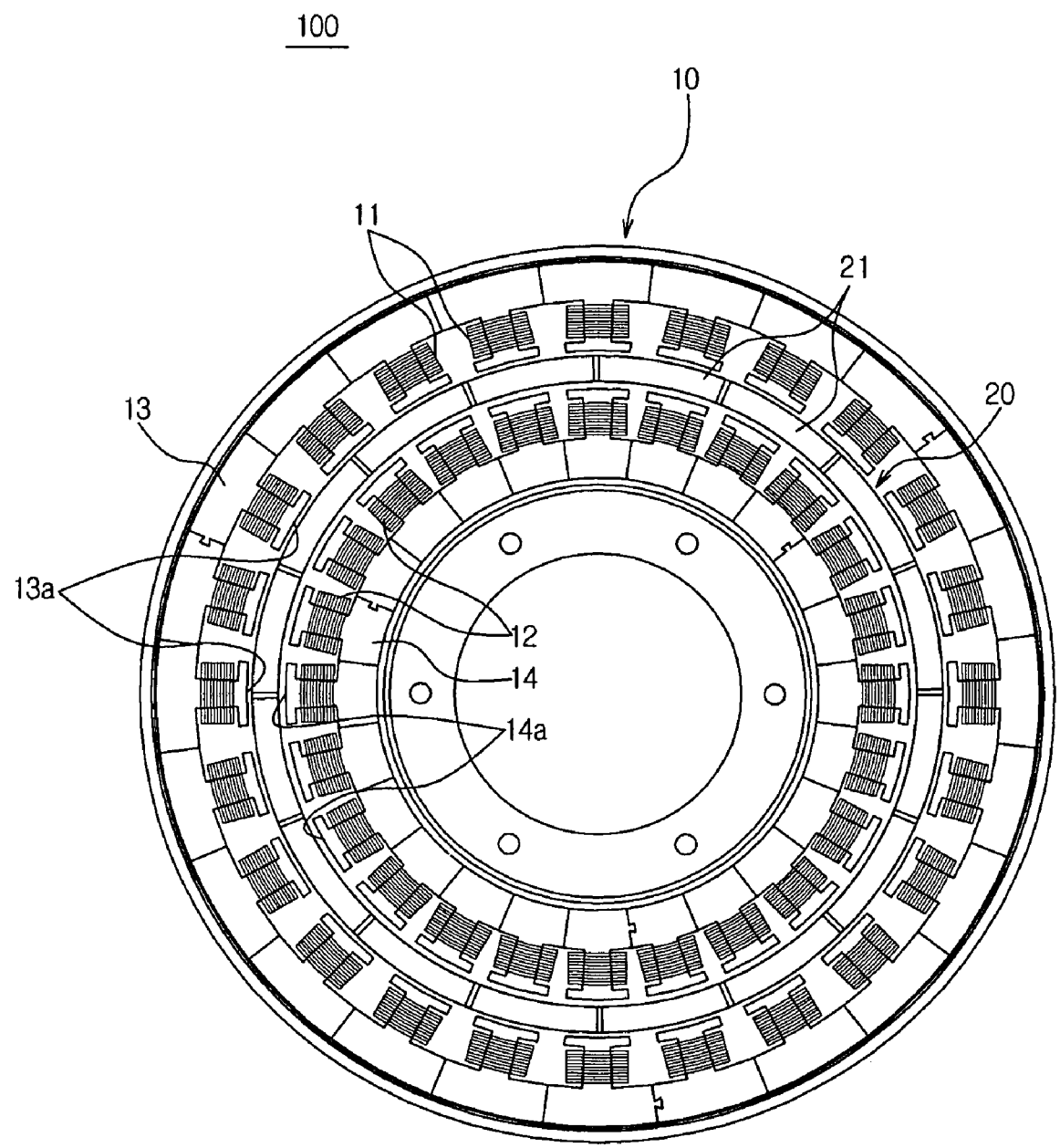
FIG. 2 is a transversal-sectional view of the motor in accordance with an exemplary embodiment.
Figure 3:
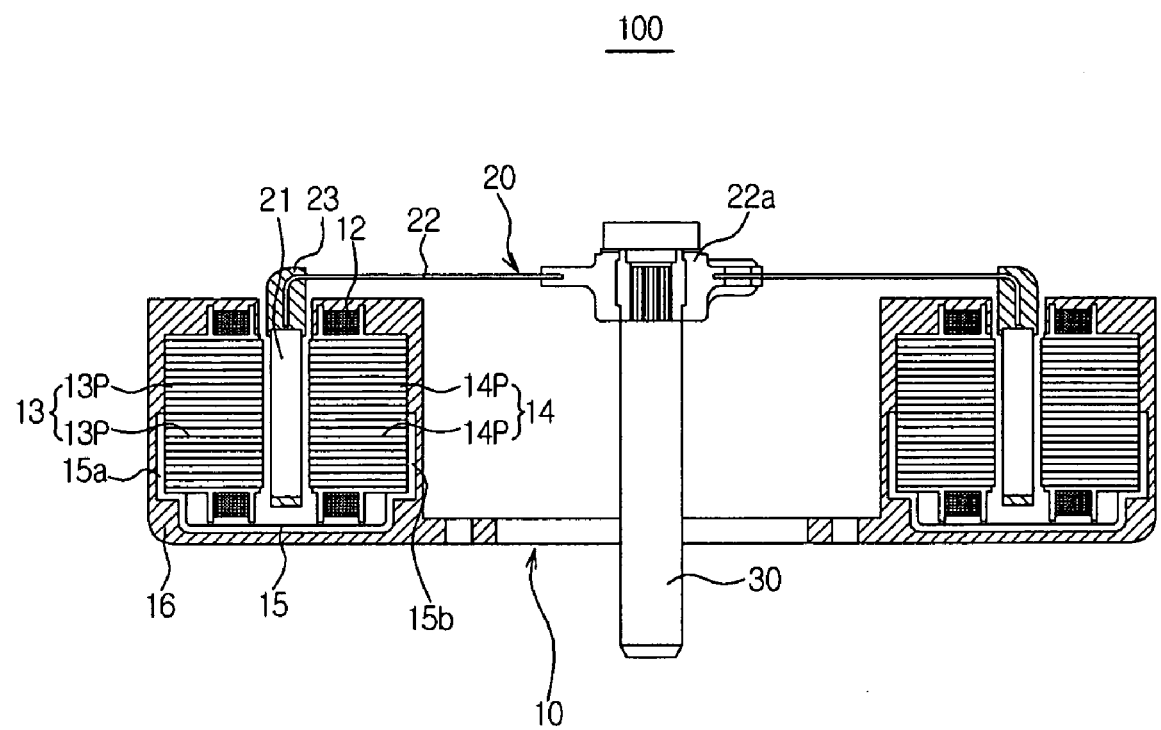
FIG. 3 is a longitudinal-sectional view of the motor in accordance with an exemplary embodiment.

As shown in FIGS. 2 and 3, the stator unit 10 includes external stators 11 and internal stators 12, which are respectively disposed in a ring shape and are separated from each other in a radial direction. The rotor unit 20 includes rotors 21, which are disposed in a ring shape, installed between the external stators 11 and the internal stators 12. The rotor unit 20 is rotated by interaction with the external stators 11 and the internal stators 12. In an exemplary embodiment, a plurality of the external stators 11 and a plurality of the internal stators 12 consist of coils, obtained by winding a wire, and are disposed in a circumferential direction, and a plurality of the rotors 21 consists of permanent magnets and is disposed in a circumferential direction. When power is applied to the external stators 11 and the internal stators 12 consisting of the coils, the external stators 11 and the internal stators 12 generate magnetic fields. These magnetic fields interact with magnetic fields generated from the rotors 21 consisting of the permanent magnets, thereby rotating the rotor unit 20 and thus rotating the rotary shaft 30.

Here, since the rotors 21 of the motor 10 interact with the internal stators 12 installed at the internal portion of the motor 10 as well as the external stators 11 installed at the external portion of the motor 10, the motor 10 generates a relatively high rotary force, compared with the conventional motor including only one stator.

The stator unit 10 further includes an external bobbin 13 and an internal bobbin 14, on which the wire is wound so as to respectively form the coils of the external stators 11 and the internal stators 12. The external bobbin 13 has a ring shape, and is provided with a plurality of external teeth 13a, on which the wire is wound, extended inwardly from the inner circumferential surface thereof, and the wire is wound on the external teeth 13a so as to form the coils of the external stators 11. The internal bobbin 14 has a ring shape, is provided with a plurality of internal teeth 14a, on which the wire is wound, extended outwardly from the outer circumferential surface thereof, and the wire is wound on the internal teeth 14a so as to form the coils of the internal stators 12.

The stator unit 10 further includes a support frame 15 having a ring shape and provided with an external support rib 15a formed at the outer circumferential surface thereof for supporting the outer circumferential surface of the external bobbin 13 and an internal support rib 15b formed at the inner circumferential surface thereof for supporting the inner circumferential surface of the internal bobbin 14, and a stator fixing member 16 formed by insert injection molding, under the condition that the external stators 11 and the internal stators 12 are installed on the support frame 15, for fixing the external stators 11 and the internal stators 12.

Figure 4:
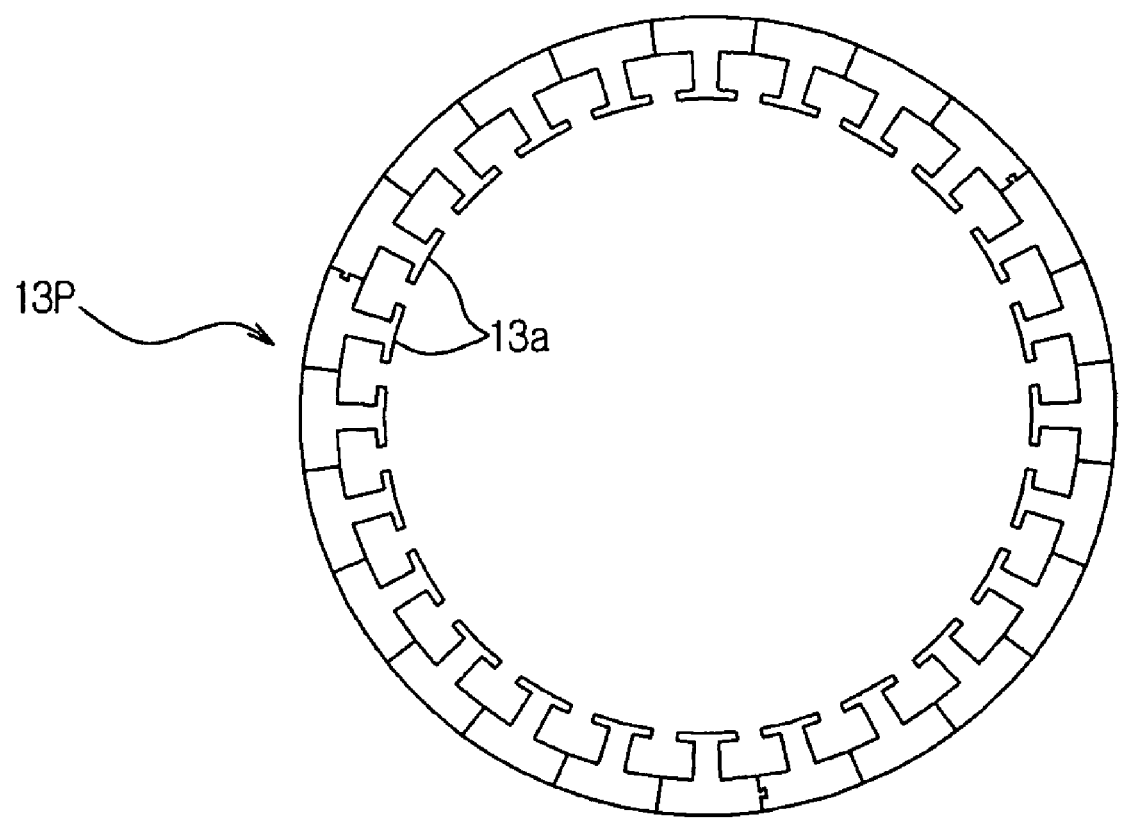
FIG. 4 is a view illustrating an external bobbin plate applied to the motor in accordance with an exemplary embodiment.
Figure 5:
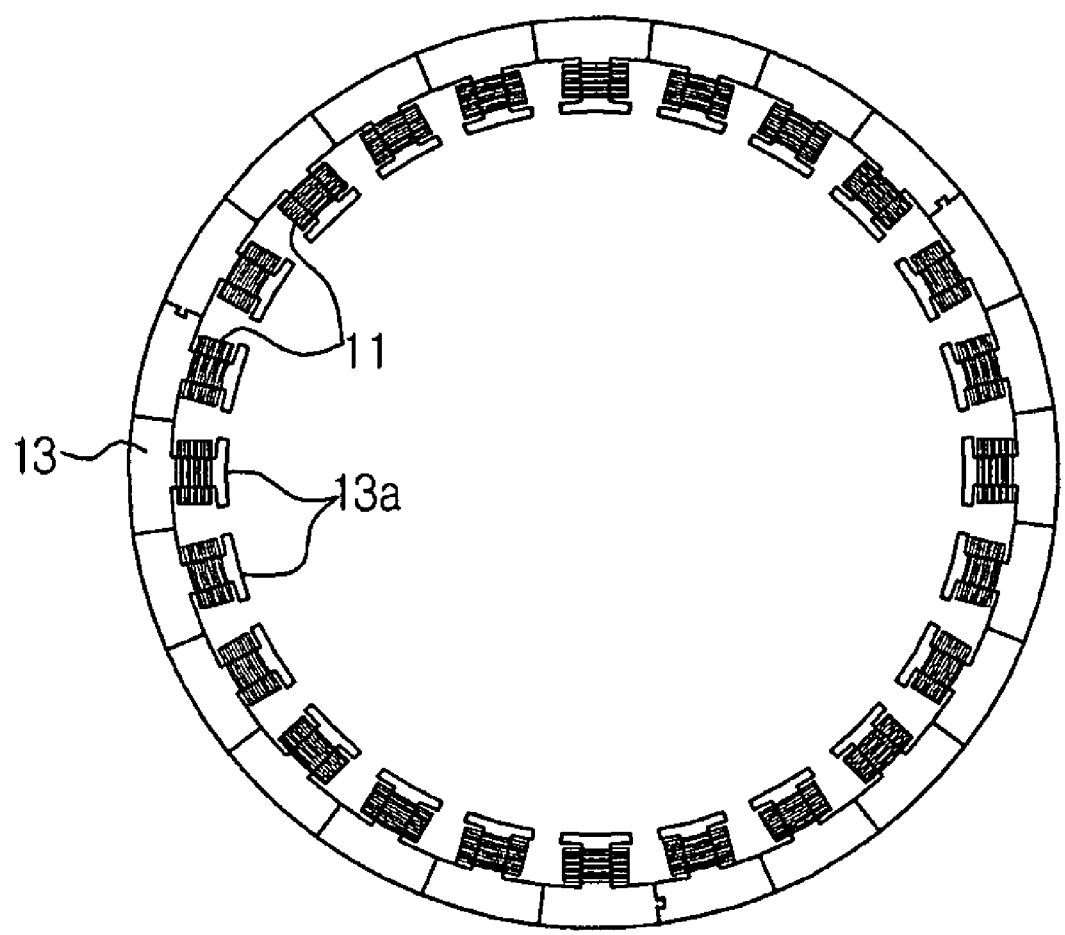
FIG. 5 is a view illustrating an external bobbin and external stators applied to the motor in accordance with an exemplary embodiment.

As shown in FIG. 4, the external bobbin 13 is formed by stacking a plurality of external bobbin plates 13P, each of which is a metal plate having a ring shape, provided with the plurality of external teeth 13a extended inwardly from the inner circumferential surfaces thereof. After the external bobbin 13 is formed by stacking the plurality of external bobbin plates 13P, a wire is wound on the external bobbin 13, as shown in FIG. 5, thus producing the external stators 11. Then, magnetic fields generated from the external stators 11 easily pass through the external bobbin 13 made of metal, thereby reducing magnetic flux leakage and thus improving the performance of the motor 100.

Figure 6:
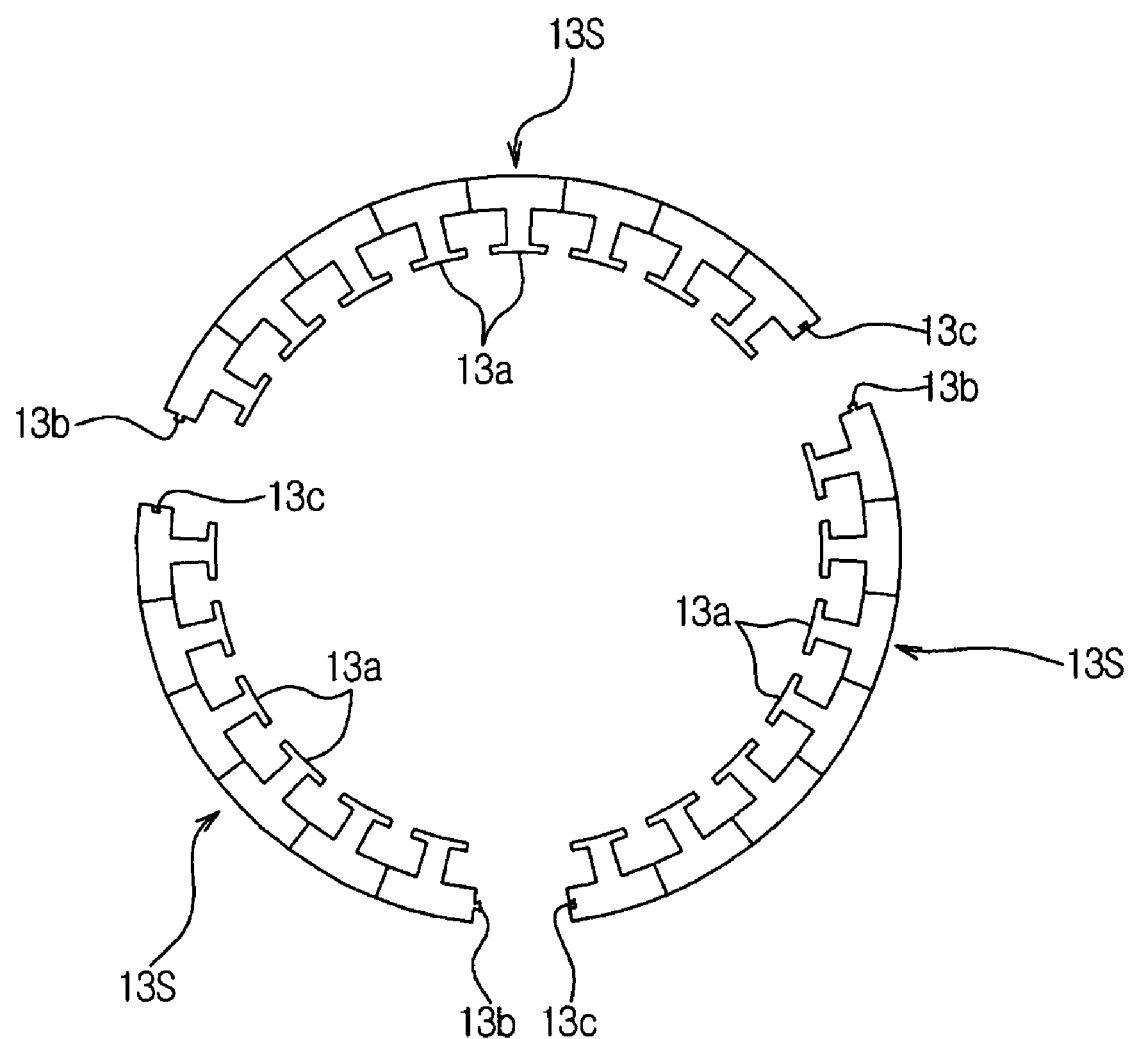
FIG. 6 is a view illustrating external divided plates applied to the motor in accordance with an exemplary embodiment.

As shown in FIG. 6, each of the plurality of external bobbin plates 13P is formed by connecting a plurality of external divided plates 13S, each of which has an arc shape and is provided with the plurality of external teeth 13a extended from one surface thereof. In order to connect the plurality of external divided plates 13S, an external fixing protrusion 13b is formed on one end of each of the plurality of external divided plates 13S so as to be fixed to the other end of the neighboring one of the plurality of external divided plates 13S, and an external fixing groove 13c is formed in the other end of each of the plurality of external divided plates 13S so as to be fixed to one end of the neighboring one of the plurality of external divided plates 13S.

Figure 7:
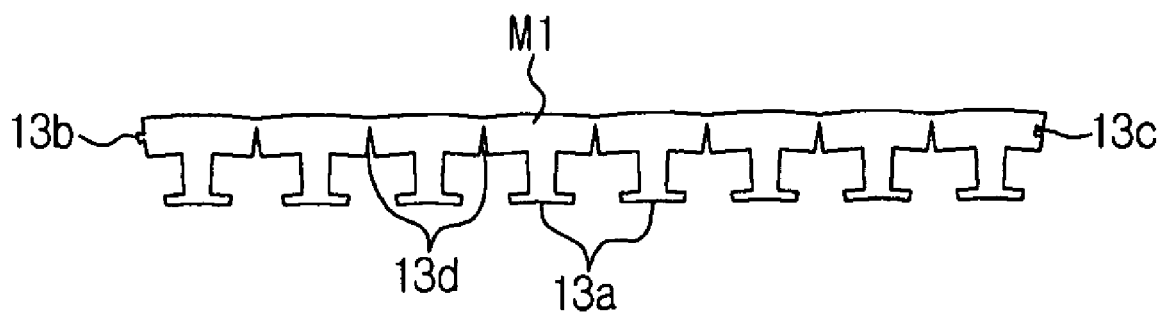
FIG. 7 is a view illustrating an external metal plate applied to the motor in accordance with an exemplary embodiment.

Further, each of the plurality of external divided plates 13S is formed by bending an external metal plate M1, having a designated length and width and provided with the plurality of external teeth 13a extended from one surface thereof in a width direction, into an arc shape, as shown in FIG. 7. Here, external bending grooves 13d for allowing the external metal plate M1 to be easily bent are depressed in one surface of the external metal plate M1 in the width direction, so that the surface of the external metal plate M1 provided with the external bending grooves 13d forms the inner circumferential portion of each of the plurality of external divided plates 13S.

With reference to FIGS. 2 and 3 again, the rotor unit 20 further includes a hub plate 22 having a disk shape and provided with a shaft installation part 22a formed through the central portion thereof, in which the rotary shaft 30 is installed, and a rotor fixing member 23 formed by insert injection molding, under the condition that the plurality of rotors 21 consisting of the permanent magnets is disposed in a ring shape on the outer circumferential surface of the hub plate 22, for fixing the plurality of the rotors 21 disposed in the ring shape to the outer circumferential surface of the hub plate 22.

Figure 8:
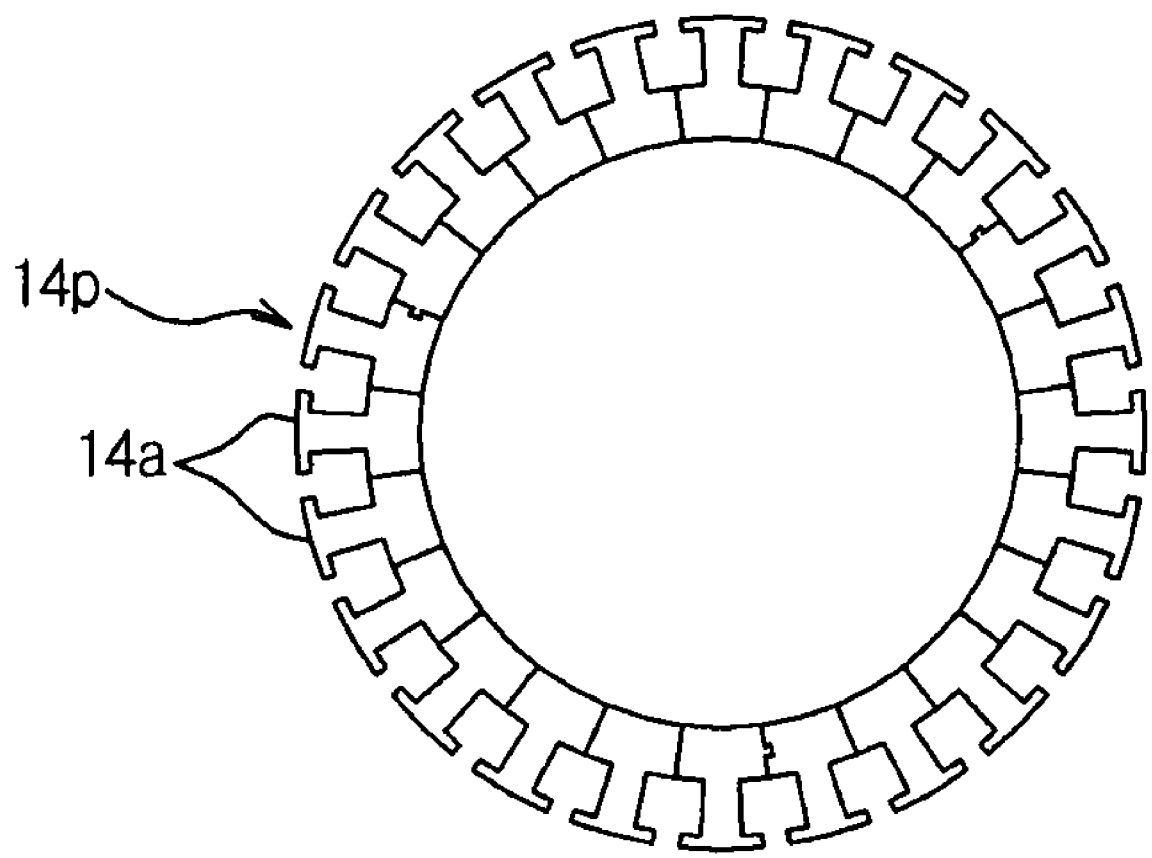
FIG. 8 is a view illustrating an internal bobbin plate applied to the motor in accordance with an exemplary embodiment.
Figure 9:
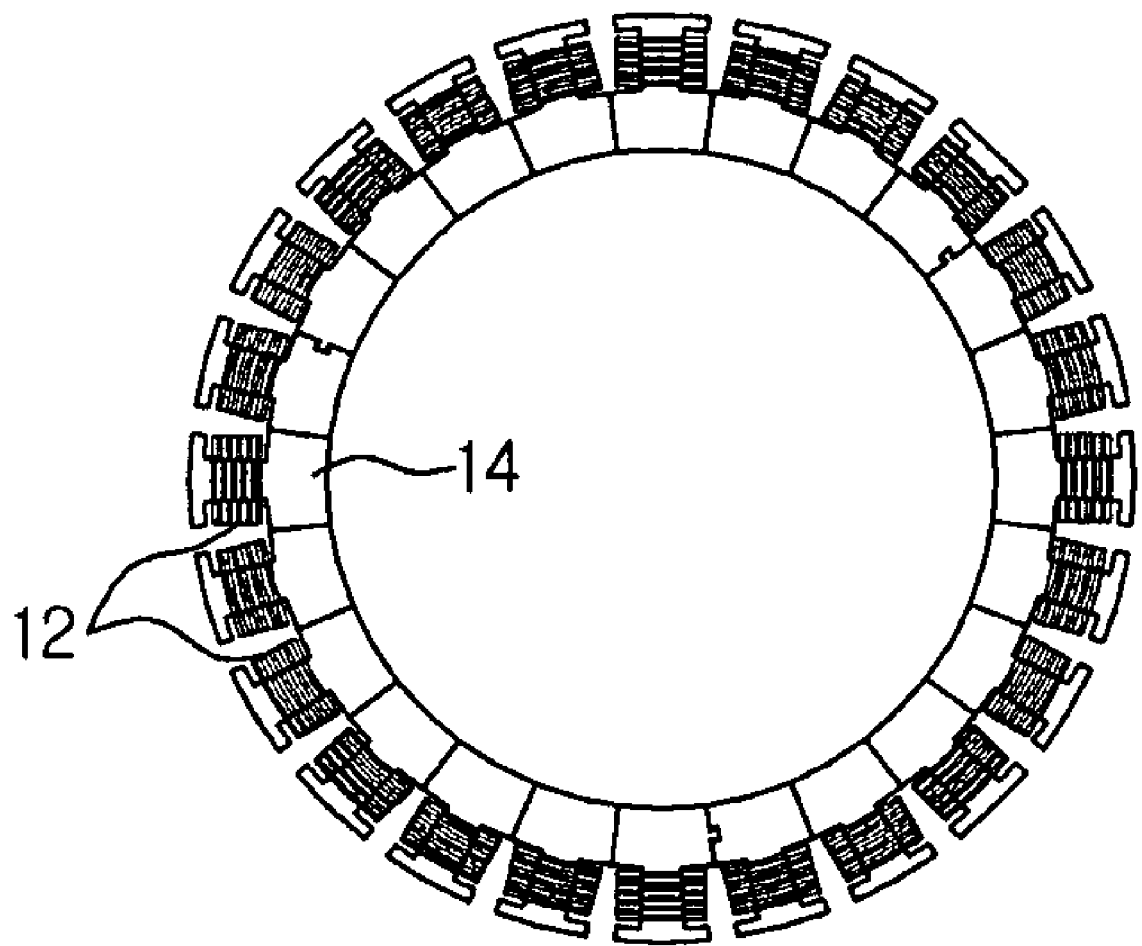
FIG. 9 is a view illustrating an internal bobbin and internal stators applied to the motor in accordance with an exemplary embodiment.

As shown in FIG. 8, the internal bobbin 14 is formed by stacking a plurality of internal bobbin plates 14P, each of which is a metal plate having a ring shape, provided with the plurality of internal teeth 13a extended outwardly from the outer circumferential surfaces thereof. After the internal bobbin 14 is formed by stacking the plurality of internal bobbin plates 14P, a wire is wound on the internal bobbin 14, as shown in FIG. 9, thus producing the internal stators 12. Then, magnetic fields generated from the internal stators 12 easily pass through the internal bobbin 14, thereby reducing magnetic flux leakage and thus improving the performance of the motor 100.

Figure 10:
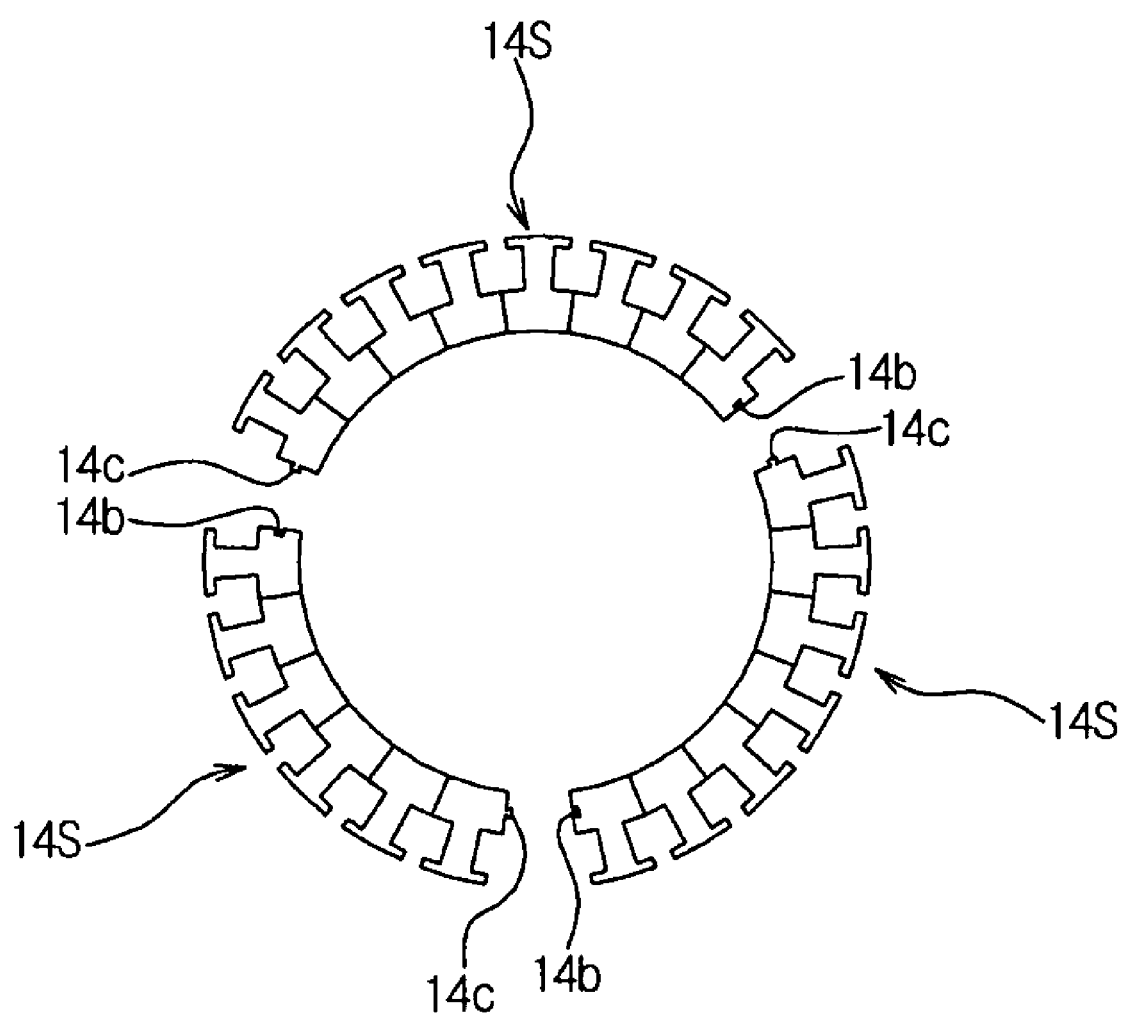
FIG. 10 is a view illustrating internal divided plates applied to the motor in accordance with an exemplary embodiment.

As shown in FIG. 10, each of the plurality of internal bobbin plates 14P is formed by connecting a plurality of internal divided plates 14S, each of which has an arc shape and is provided with the plurality of internal teeth 14a extended from one surface thereof. In order to connect the plurality of internal divided plates 14S, an internal fixing protrusion 14b is formed on one end of each of the plurality of internal divided plates 14S so as to be fixed to the other end of the neighboring one of the plurality of internal divided plates 14S, and an internal fixing groove 14c is formed in the other end of each of the plurality of internal divided plates 14S so as to be fixed to one end of the neighboring one of the plurality of internal divided plates 14S.

Figure 11:
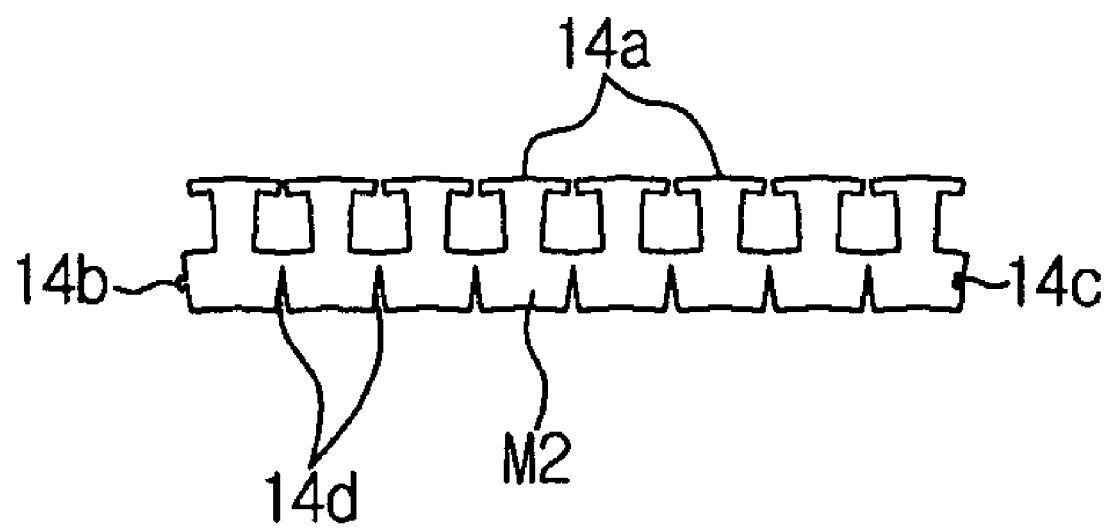
FIG. 11 is a view illustrating an internal metal plate applied to the motor in accordance with an exemplary embodiment.

Further, each of the plurality of internal divided plates 14S is formed by bending an internal metal plate M2 having a designated length and width and provided with the plurality of internal teeth 14a extended from one surface thereof in a width direction, into an arc shape, as shown in FIG. 11. Here, internal bending grooves 14d for allowing the internal metal plate M2 to be easily bent are depressed in the other surface of the internal metal plate M2 in the width direction, so that the surface of the internal metal plate M2 provided with the internal bending grooves 14d forms the inner circumferential portion of each of the plurality of internal divided plates 14S. Accordingly, after the plurality of external metal plates M1 and the plurality of internal metal plates M are bent in an arc shape to produce the plurality of external divided plates 13S and the plurality of internal divided plates 14S, as shown in FIGS. 6 and 10, the plurality of the external divided plates 13S is connected through the external fixing protrusions 13b and the external fixing grooves 13c formed at both ends thereof to form the plurality of external bobbin plates 13P, as shown in FIG. 4, and the plurality of the internal divided plates 14S is connected through the internal fixing protrusions 14b and the internal fixing grooves 14c formed at both ends thereof to form the plurality of internal bobbin plates 14P, as shown in FIG. 8.

Thereafter, the plurality of external bobbin plates 13P is stacked to form the external bobbin 13 and the plurality of internal bobbin plates 14P is stacked to form the internal bobbin 14. Then, the wire is wound on the external teeth 13a and the internal teeth 14a respectively provided on the external bobbin 13 and the internal bobbin 14, thus forming the external stators 11 and the internal stators 12 consisting of the coils, obtained by winding the wire on the external teeth 13a and the internal teeth 14a, as shown in FIGS. 5 and 9.

Figure 12:
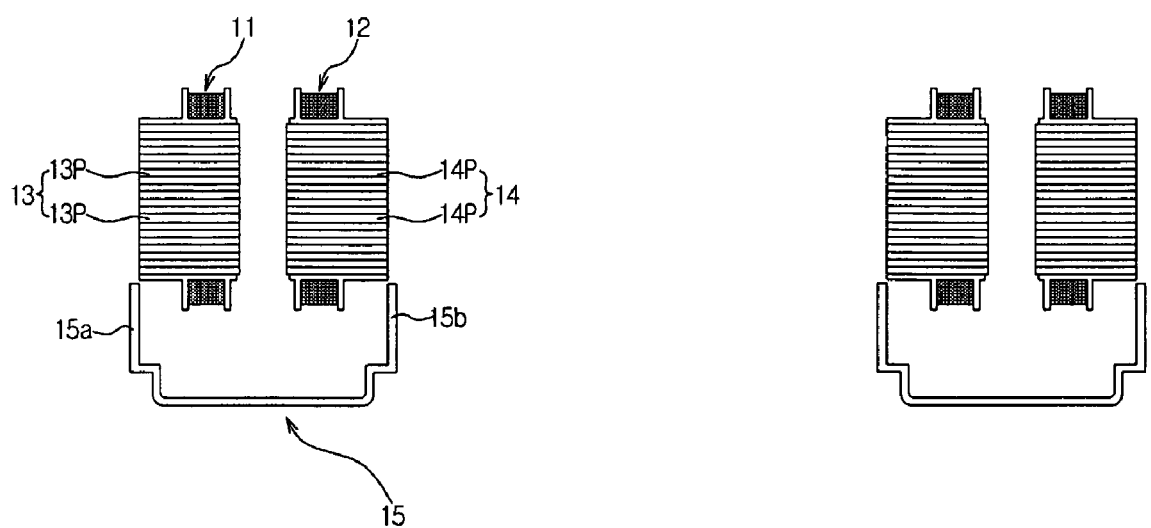
FIG. 12 is a view illustrating a state in which the external bobbin and the internal bobbin applied to the motor in accordance with an exemplary embodiment are installed on a support frame.
Figure 13:
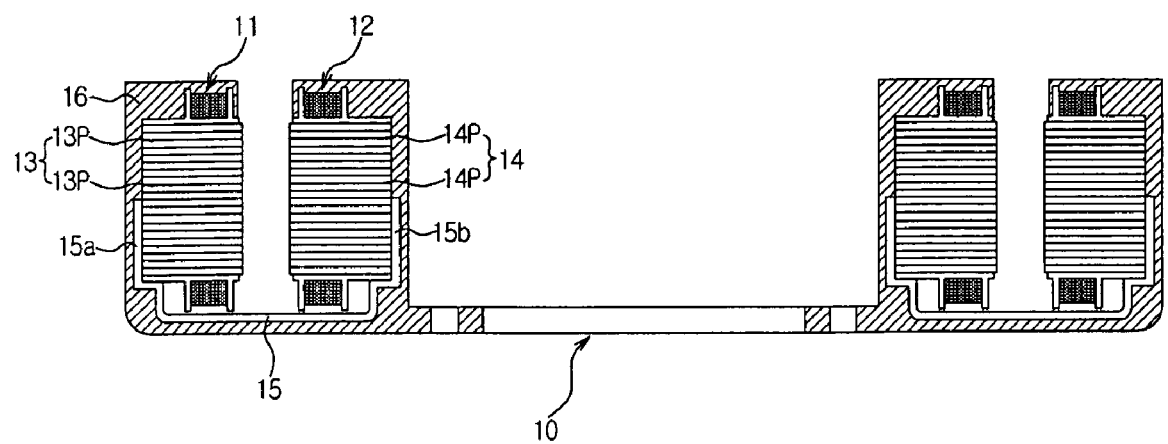
FIG. 13 is a view illustrating a stator unit applied to the motor in accordance with an exemplary embodiment.
Figure 14:
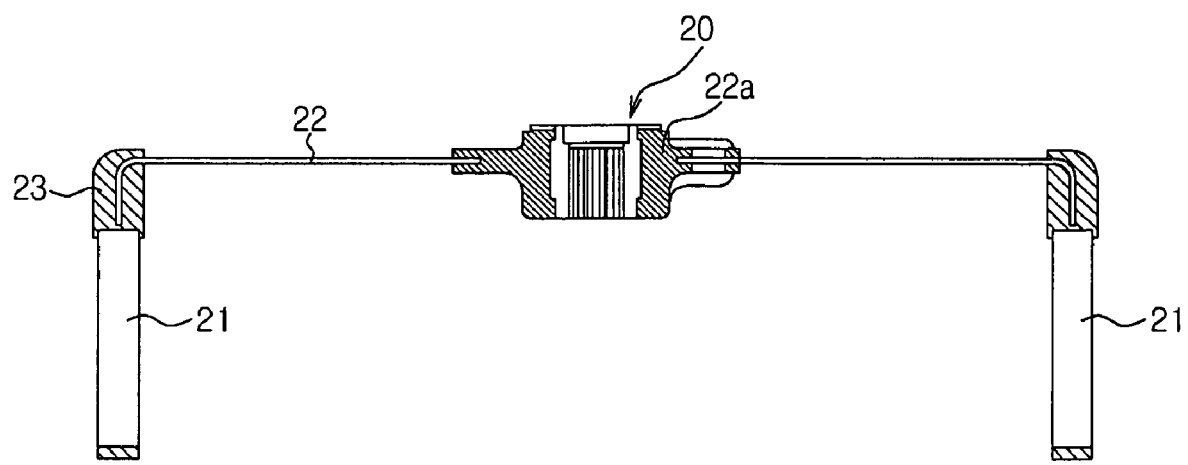
FIG. 14 is a view illustrating a rotor unit applied to the motor in accordance with an exemplary embodiment.

Thereafter, the external stators 11 and the internal stators 12 are installed on the support frame 15 such that the outer circumferential surface of the external bobbin 13 is supported by the external support rib 15a and the inner circumferential surface of the internal bobbin 14 is supported by the internal support rib 15b, as shown in FIG. 12. Then, when the stator fixing member 16 is formed by insert injection molding, as shown in FIG. 13, the stator fixing member 16 fixes the external stators 11 and the internal stators 12 under the condition that the external stators 11 and the internal stators 12 are installed on the support frame 15. Thereby, the manufacture of the stator unit 10 is finished.

Thereafter, when the plurality of rotors 21 consisting of the permanent magnets is disposed in a ring shape and the rotor fixing member 23 is formed by insert injection molding under this state, the rotor fixing member 23 fixes the rotors 21 under the condition that the rotors 21 are disposed in the ring shape on the outer circumferential surface of the hub plate 22. Thereby, the manufacture of the rotor unit 20 is finished.

Thereafter, the rotor unit 20 is installed such that the rotors 21 are disposed in a space between the external stators 11 and the internal stators 12 of the stator unit 10, as shown in FIG. 3. Thereby, the manufacture of the motor 100 is finished.

As apparent from the above description, an exemplary embodiment provides a motor, which includes external stators and internal stators respectively disposed in a ring shape and separated from each other in a radial direction, and rotors disposed in a ring shape and rotatably installed between the external stators and the internal stators such that the rotors interact with the external stators and the internal stators, so as to generate a high rotary force while maintaining a uniform length in an axial direction, and a drum washing machine having the motor.

Further, since an external bobbin and an internal bobbin are formed by stacking external bobbin plates and internal bobbin plates, i.e., metal plates, magnetic fields generated from the external stators and the internal stators easily flow through the external bobbin and the internal bobbin, thereby reducing magnetic flux leakage and thus improving the performance of the motor.

Although a few exemplary embodiments have been shown and described, it would be appreciated by those skilled in the art that changes may be made in these exemplary embodiments, the scope of which is defined in the claims and their equivalents.

What is claimed is:

1. A motor comprising:
    a stator unit including external stators and internal stators, which are respectively disposed in a ring shape and which are separated from each other in a radial direction; and
    a rotor unit including rotors, which are disposed in a ring shape and which are rotatably installed between the external stators and the internal stators,
    wherein the external stators and the internal stators are coils obtained by winding a wire, and wherein the rotors are permanent magnets;
    wherein the stator unit further includes an external bobbin having a ring shape and provided with a plurality of external teeth extended from the inner circumferential surface thereof to form the coils of the external stators, and an internal bobbin having a ring shape and provided with a plurality of internal teeth extended from the outer circumferential surface thereof to form the coils of the internal stators; and
    wherein the stator unit further includes a support frame having a ring shape and provided with an external support rib formed at the outer circumferential surface thereof to support the outer circumferential surface of the external bobbin and an internal support rib formed at the inner circumferential surface thereof to support the inner circumferential surface of the internal bobbin, and a stator fixing member formed by insert injection molding to fix the external stators and the internal stators under the condition that the external stators and the internal stators are installed on the support frame.

2. The motor according to claim 1, wherein the rotor unit further includes a hub plate having a disk shape and provided with a shaft installation part formed through the central portion thereof, in which a rotary shaft is installed, and a rotor fixing member formed by insert injection molding to fix the rotors to the outer circumferential surface of the hub plate under the condition that the rotors are disposed in the ring shape.

3. The motor according to claim 1, wherein the external bobbin is formed by stacking a plurality of external bobbin plates, each of which is a metal plate having a ring shape, provided with the plurality of external teeth extended from the inner circumferential surfaces thereof.

4. The motor according to claim 3, wherein each of the plurality of external bobbin plates is formed by connecting a plurality of external divided plates, each of which has an arc shape.

5. The motor according to claim 4, wherein an external fixing protrusion is formed on one end of each of the plurality of external divided plates so as to be fixed to the other end of the neighboring one of the plurality of external divided plates, and an external fixing groove is formed in the other end of each of the plurality of external divided plates so as to be fixed to one end of the neighboring one of the plurality of external divided plates.

6. The motor according to claim 5, wherein each of the plurality of external divided plates is formed by bending an external metal plate having a designated length and width and provided with the plurality of external teeth extended from one surface thereof in a width direction, and a plurality of external bending grooves, which allow the external metal plate to be easily bent, are depressed in one surface of the external metal plate in the width direction.

7. The motor according to claim 1, wherein the internal bobbin is formed by stacking a plurality of internal bobbin plates, each of which is a metal plate having a ring shape, provided with the plurality of internal teeth extended from the outer circumferential surfaces thereof.

8. The motor according to claim 7, wherein each of the plurality of internal bobbin plates is formed by connecting a plurality of internal divided plates, each of which has an arc shape.

9. The motor according to claim 8, wherein an internal fixing protrusion is formed on one end of each of the plurality of internal divided plates so as to be fixed to the other end of the neighboring one of the plurality of internal divided plates, and an internal fixing groove is formed in the other end of each of the plurality of internal divided plates so as to be fixed to one end of the neighboring one of the plurality of internal divided plates.

10. The motor according to claim 9, wherein each of the plurality of internal divided plates is formed by bending an internal metal plate having a designated length and width and provided with the plurality of internal teeth extended from one surface thereof in a width direction, and a plurality of internal bending grooves, which allow the internal metal plate to be easily bent, are depressed in the other surface of the internal metal plate in the width direction.

11. A drum washing machine comprising a tub containing washing water, a drum rotatably installed in the tub, and a motor installed on the rear surface of the tub to rotate the drum, wherein a motor includes:
    a stator unit including external stators and internal stators, which are respectively disposed in a ring shape and which are separated from each other in a radial direction; and
    a rotor unit including rotors, which are disposed in a ring shape and which are rotatably installed between the external stators and the internal stators,
    wherein the external stators and the internal stators are coils obtained by winding a wire, and wherein the rotors are permanent magnets;
    wherein the stator unit further includes an external bobbin having a ring shape and provided with a plurality of external teeth extended from the inner circumferential surface thereof to form the coils of the external stators, and an internal bobbin having a ring shape and provided with a plurality of internal teeth extended from the outer circumferential surface thereof to form the coils of the internal stators; and
    wherein the stator unit further includes a support frame having a ring shape and provided with an external support rib formed at the outer circumferential surface thereof to support the outer circumferential surface of the external bobbin and an internal support rib formed at the inner circumferential surface thereof to support the inner circumferential surface of the internal bobbin, and a stator fixing member formed by insert injection molding to fix the external stators and the internal stators under the condition that the external stators and the internal stators are installed on the support frame.

12. The drum washing machine according to claim 11, wherein the rotor unit further includes a hub plate having a disk shape and provided with a shaft installation part formed through the central portion thereof, in which a rotary shaft is installed, and a rotor fixing member formed by insert injection molding to fix the rotors to the outer circumferential surface of the hub plate under the condition that the rotors are disposed in the ring shape.

13. The drum washing machine according to claim 11, wherein the external bobbin is formed by stacking a plurality of external bobbin plates, each of which is a metal plate having a ring shape, provided with the plurality of external teeth extended from the inner circumferential surfaces thereof.

14. The drum washing machine according to claim 13, wherein each of the plurality of external bobbin plates is formed by connecting a plurality of external divided plates, each of which has an arc shape.

15. The drum washing machine according to claim 14, wherein an external fixing protrusion is formed on one end of each of the plurality of external divided plates so as to be fixed to the other end of the neighboring one of the plurality of external divided plates, and an external fixing groove is formed in the other end of each of the plurality of external divided plates so as to be fixed to one end of the neighboring one of the plurality of external divided plates.

16. The drum washing machine according to claim 15, wherein each of the plurality of external divided plates is formed by bending an external metal plate having a designated length and width and provided with the plurality of external teeth extended from one surface thereof in a width direction, and a plurality of external bending grooves, which allow the external metal plate to be easily bent, are depressed in one surface of the external metal plate in the width direction.

17. The drum washing machine according to claim 11, wherein the internal bobbin is formed by stacking a plurality of internal bobbin plates, each of which is a metal plate having a ring shape, provided with the plurality of internal teeth extended from the outer circumferential surfaces thereof.

18. The drum washing machine according to claim 17, wherein each of the plurality of internal bobbin plates is formed by connecting a plurality of internal divided plates, each of which has an arc shape.

19. The drum washing machine according to claim 18, wherein an internal fixing protrusion is formed on one end of each of the plurality of internal divided plates so as to be fixed to the other end of the neighboring one of the plurality of internal divided plates, and an internal fixing groove is formed in the other end of each of the plurality of internal divided plates so as to be fixed to one end of the neighboring one of the plurality of internal divided plates.

20. The drum washing machine according to claim 19, wherein each of the plurality of internal divided plates is formed by bending an internal metal plate having a designated length and width and provided with the plurality of internal teeth extended from one surface thereof in a width direction, and a plurality of internal bending grooves, which allow the internal metal plate to be easily bent, are depressed in the other surface of the internal metal plate in the width direction.

* * * * *

UNITED STATES PATENT AND TRADEMARK OFFICE
CERTIFICATE OF CORRECTION

| | | |
|---|---|---|
| PATENT NO. | : 7,830,064 B2 | |
| APPLICATION NO. | : 12/078475 | |
| DATED | : November 9, 2010 | |
| INVENTOR(S) | : Jang Jun Lee et al. | |

It is certified that error appears in the above-identified patent and that said Letters Patent is hereby corrected as shown below:

Title Page item 56 Column 2 (Other Publications), Line 1 after "Action" insert -- issued --.

Signed and Sealed this
Eighth Day of February, 2011

David J. Kappos
*Director of the United States Patent and Trademark Office*